(12) United States Patent
Yamauchi et al.

(10) Patent No.: US 10,941,056 B2
(45) Date of Patent: Mar. 9, 2021

(54) WATER TREATMENT DEVICE AND WATER TREATMENT METHOD

(71) Applicant: Mitsubishi Electric Corporation, Chiyoda-ku (JP)

(72) Inventors: Tokiko Yamauchi, Chiyoda-ku (JP); Yoshihiro Nakayama, Chiyoda-ku (JP); Eiji Imamura, Chiyoda-ku (JP); Nozomu Yasunaga, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 91 days.

(21) Appl. No.: 15/774,045

(22) PCT Filed: Dec. 26, 2016

(86) PCT No.: PCT/JP2016/088641
§ 371 (c)(1),
(2) Date: May 7, 2018

(87) PCT Pub. No.: WO2017/122520
PCT Pub. Date: Jul. 20, 2017

(65) Prior Publication Data
US 2018/0327288 A1    Nov. 15, 2018

(30) Foreign Application Priority Data

Jan. 12, 2016    (JP) .............................. JP2016-003279

(51) Int. Cl.
*C02F 1/461*    (2006.01)
*C02F 1/469*    (2006.01)
*C02F 103/08*    (2006.01)

(52) U.S. Cl.
CPC ........ *C02F 1/46109* (2013.01); *C02F 1/4691* (2013.01); *C02F 2001/46119* (2013.01);
(Continued)

(58) Field of Classification Search
CPC ................................................... C02F 1/4691
See application file for complete search history.

(56) References Cited

U.S. PATENT DOCUMENTS 5,425,858 A        6/1995  Farmer
5,620,597 A  *    4/1997  Andelman ............ B01D 15/00
                                                                    204/600
(Continued)

FOREIGN PATENT DOCUMENTS

JP        56-121488 U1    9/1981
JP         61-95295 A      5/1986
(Continued)

OTHER PUBLICATIONS

International Search Report dated Feb. 7, 2017 in PCT/JP2016/088641 filed Dec. 26, 2016.
(Continued)

*Primary Examiner* — Louis J Rufo
(74) *Attorney, Agent, or Firm* — Xsensus LLP

(57) ABSTRACT

A water treatment device in which a treatment target water introduction portion is provided in an upper portion of a receptacle, and the water treatment device has a space in which conductive porous members are not disposed between the conductive porous members and the treatment target water introduction portion in the receptacle. When a backwashing fluid is introduced from a lower portion of the receptacle in a desorption, the conductive porous members flow and are agitated owing to the backwashing fluid, because of which a desorption of ions adsorbed to the conductive porous members is promoted. Grains of the agitated conductive porous members collide with other grains of the conductive porous members or with electrodes or a separator, whereby scale and a biofilm appearing on surfaces of the grains of the conductive porous members, the (Continued)

electrodes, or the separator can be removed, and desalination efficiency can be maintained.

18 Claims, 10 Drawing Sheets

(52) U.S. Cl.
CPC ............... *C02F 2001/46133* (2013.01); *C02F 2103/08* (2013.01); *C02F 2201/002* (2013.01); *C02F 2201/46115* (2013.01); *C02F 2201/46195* (2013.01)

(56) References Cited

U.S. PATENT DOCUMENTS

| | | |
|---|---|---|
| 5,954,937 A | 9/1999 | Farmer |
| 6,309,532 B1 | 10/2001 | Tran et al. |
| 2008/0078673 A1* | 4/2008 | Elson .................. C02F 1/46114 204/278.5 |
| 2012/0217170 A1* | 8/2012 | Van Der Wal ........ C02F 1/4691 205/743 |
| 2012/0247959 A1 | 10/2012 | Seed et al. |

FOREIGN PATENT DOCUMENTS

| | | |
|---|---|---|
| JP | 1-123690 A | 5/1989 |
| JP | 7-163845 A | 6/1995 |
| JP | 11-505463 A | 5/1999 |
| JP | 2002-336863 A | 11/2002 |
| JP | 3893740 B2 | 3/2007 |
| JP | 4026344 B2 | 12/2007 |
| JP | 5687620 B2 | 3/2015 |

OTHER PUBLICATIONS

Office Action dated Jul. 20, 2020 in Chinese Patent Application No. 201680077820.8, 16 pages.

* cited by examiner

WATER TREATMENT DEVICE AND WATER TREATMENT METHOD

TECHNICAL FIELD

The present invention relates to a water treatment device that carries out a desalination process on treatment target water, and to a water treatment method.

BACKGROUND ART

Electrical desalination technology in which a water passage type electric double layer is used is known as an existing method for a desalination process of removing ions from seawater, reclaimed water, or the like. For example, an electrolytic capacitor type desalination device such that a liquid permeable, electrically insulating separator is disposed between a pair of electrodes, and an ion trapping member is provided between the electrodes and the separator, is presented in Patent Document 1.

The kind of water treatment device in the existing example is such that when treatment target water is introduced in a state wherein voltage is applied to the electrodes, an electric double layer is formed in the ion trapping member, anions in the treatment target water collect on a positive electrode side and are adsorbed to an anion exchange member, and cations collect on a negative electrode side and are adsorbed to a cation exchange member. In Patent Document 1, a mixture of activated carbon and an ion exchange member is used as the ion trapping member, and an increase in ion adsorption force is achieved owing to an effect of combining electrical attraction and chemical attraction.

The heretofore described kind of water treatment device is such that an adsorption step of causing ions to be adsorbed to an ion trapping member such as activated carbon, thereby carrying out a desalination process, and a description step of causing an ion adsorption capacity of the ion trapping member to recover need to be implemented alternately. In the desorption step, a charge between the electrodes is released by causing the electrodes to short circuit (or by applying a reverse voltage), whereby ions adsorbed to the ion trapping member are desorbed, and the ion adsorption capacity of the ion trapping member is caused to recover.

CITATION LIST

Patent Literature

Patent Document 1: Japanese Patent No. 3,893,740

SUMMARY OF INVENTION

Technical Problem

With the heretofore described kind of existing water treatment device, there is a problem in that scale or a biofilm caused mainly by a component of the treatment target water appears on a surface of the electrode, the separator, the ion trapping member, and the like, in accompaniment to the desalination process, causing desalination efficiency to decrease. The scale and the biofilm need to be removed by regular cleaning or replacing of the heretofore described members, and time is needed for maintenance.

The invention, having been contrived in order to resolve the heretofore described kind of problem, has an object of providing a water treatment device and a water treatment method such that scale and a biofilm that cause a decrease in desalination efficiency can be efficiently removed, and desalination efficiency can be maintained.

Solution to Problem

A water treatment device according to the invention includes at least one pair of electrodes disposed distanced from each other and opposing, an electrically insulating, water permeable separator provided between the pair of electrodes, an electrically insulation receptacle that houses the electrodes and the separator, and conductive porous members having fluidity, disposed one each in a multiple of spaces in the receptacle compartmentalized by the separator, wherein the receptacle has a treatment target water introduction portion through which treatment target water is introduced into the receptacle, and a backwashing fluid introduction portion through which a backwashing fluid is introduced into the receptacle from a direction differing from that of the treatment target water, in addition to having a space in which the conductive porous members are not disposed in one portion of the same spaces as those in which the conductive porous members are disposed.

A water treatment method according to the invention provides an electrically insulating, water permeable separator between at least one pair of electrodes housed in an electrically insulating receptacle, disposes conductive porous members having fluidity in a multiple of spaces in the receptacle compartmentalized by the separator, in addition to having a space in which the conductive porous members are not disposed in one portion of the same spaces as those in which the conductive porous members are disposed, and alternatively carries out an adsorption step of introducing treatment target water into the receptacle in a state wherein voltage is applied between the electrodes, thereby causing ions included in the treatment target water to be adsorbed to the conductive porous members, and a desorption step of releasing a charge accumulated between the electrodes, thereby causing ions adsorbed to the conductive porous members to be desorbed, wherein a backwashing fluid is introduced into the receptacle from a direction differing from that of the treatment target water in the absorption step, thereby causing the conductive porous members to flow.

Advantageous Effects of Invention

According to the water treatment device according to the invention, a space in which no conductive porous member is disposed is provided in one portion of the same spaces in a receptacle as spaces in which conductive porous members are disposed, and a backwashing fluid is introduced from a direction differing from that of treatment target water, causing the conductive porous members to flow, whereby grains of the conductive porous members are agitated, and collide with other grains of the conductive porous members or with electrodes or a separator, because of which scale and a biofilm appearing on surfaces of the grains of the conductive porous members, the electrodes, or the separator can be easily removed, and desalination efficiency can be maintained.

Also, according to the water treatment device according to the invention, a space in which no conductive porous member is disposed is provided in one portion of the same spaces in a receptacle as spaces in which conductive porous members are disposed, and a backwashing fluid is introduced from a direction differing from that of treatment target water into the receptacle, causing the conductive porous members to flow, in a desorption step, whereby grains of the conductive porous members are agitated, and collide with other grains of the conductive porous members or with electrodes or a separator, because of which scale and a biofilm appearing on surfaces of the grains of the conductive porous members, the electrodes, or the separator can be easily removed, and desalination efficiency can be maintained.

Other objects, characteristics, aspects, and advantages of the invention will become more apparent from the following detailed description of the invention, which references the drawings.

DESCRIPTION OF EMBODIMENTS

First Embodiment

Figure 1:
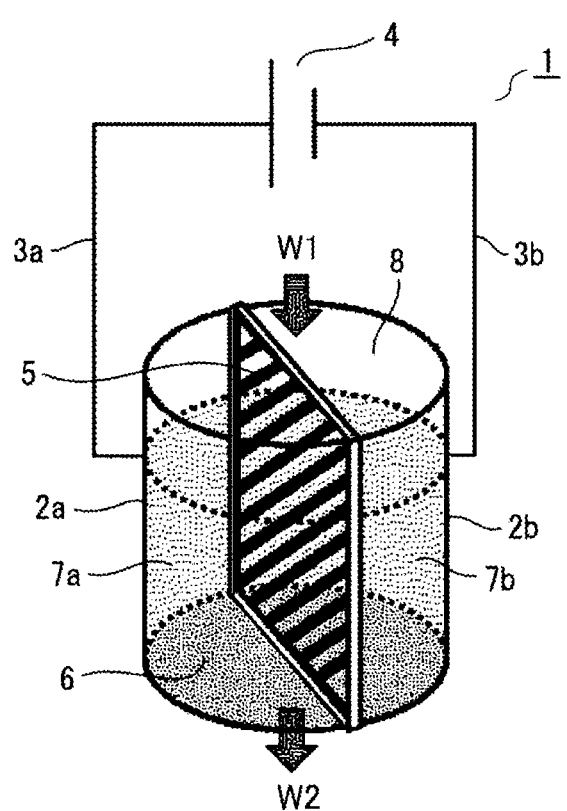
FIG. 1 is a perspective view showing a main configuration of a water treatment device according to a first embodiment of the invention.
Figure 2:
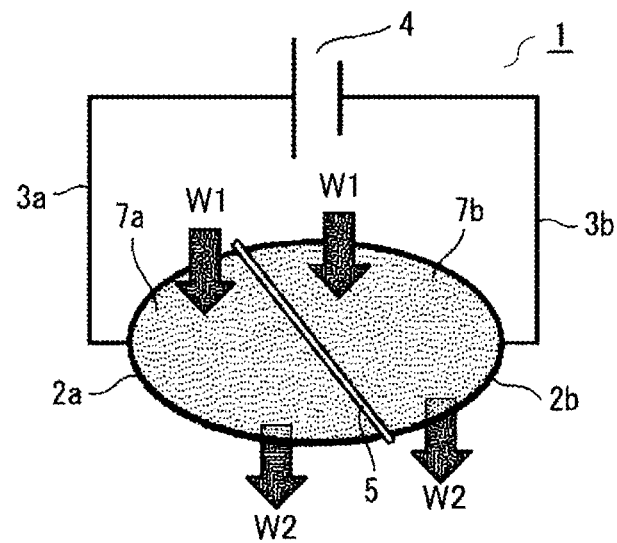
FIG. 2 is a diagram showing a main configuration in a horizontal cross-section of the water treatment device according to the first embodiment of the invention.
Figure 3:
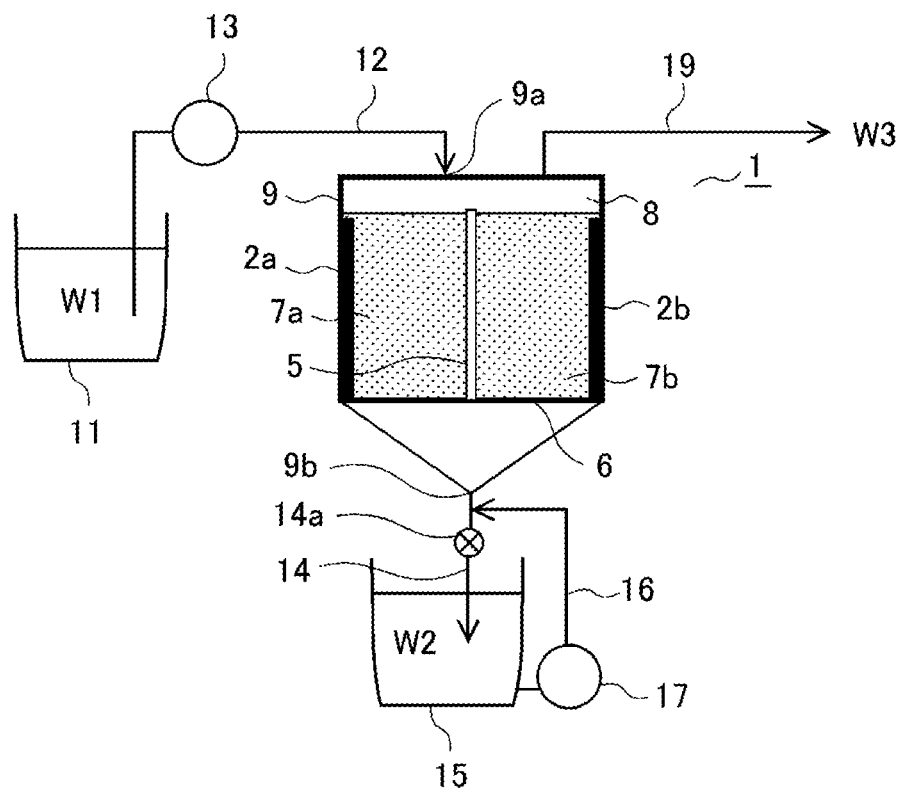
FIG. 3 is a diagram showing an overall configuration of the water treatment device according to the first embodiment of the invention.
Figure 4:
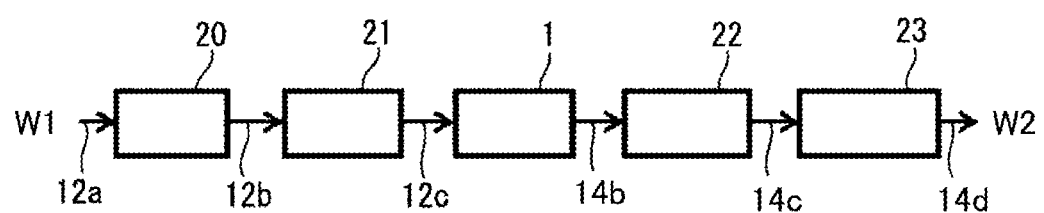
FIG. 4 is a diagram showing an example of a water treatment system in which the water treatment device according to the first embodiment of the invention is used.

Hereafter, based on the drawings, a water treatment device according to a first embodiment of the invention will be described. FIG. 1 is a diagram schematically showing a main configuration of the water treatment device according to the first embodiment, FIG. 2 is a perspective view schematically showing a main configuration in a horizontal cross-section of the water treatment device shown in FIG. 1, FIG. 3 is a schematic view showing an overall configuration of the water treatment device shown in FIG. 1, and FIG. 4 is a diagram showing an example of a water treatment system in which the water treatment device shown in FIG. 1 is used. In all the drawings, the same reference signs are allotted to identical or corresponding portions.

A water treatment device 1 is used in a desalination process that reduces an ion concentration in treatment target water. A pair of electrodes 2a and 2b (collectively referred to as electrodes 2), which are collectors, are disposed opposing and distanced from each other, and are connected to a direct current power supply 4 via electrode terminals 3a and 3b (collectively referred to as electrode terminals 3) respectively. An electrically insulating, water permeable separator 5 is provided between the pair of electrodes 2, whereby the electrodes 2a and 2b are electrically isolated from each other.

The electrodes 2 are of a structure like, for example, a bamboo tube divided into two portions along a central axis thereof, wherein a cylindrical space portion having aperture portions in a vertical direction is formed by the two concave portions being caused to oppose and brought together. That is, each of the pair of electrodes 2 has a sectional form that is bent into a semi-circle. In the first embodiment, the pair of electrodes 2 are formed integrally across the separator 5, which is of a plate form or a sheet form.

The electrodes 2 and the separator 5 are housed in an electrically insulating receptacle 9, and conductive porous members 7a and 7b (collectively referred to as conductive porous members 7) having fluidity are disposed in a multiple of spaces inside the receptacle 9, which is compartmentalized by the separator 5. A disc-form holding body 6 having water permeability is disposed in one aperture portion (a lower end portion in FIG. 3) of the cylindrical space portion formed by the pair of electrodes 2. A lower end portion of the separator 5 is joined to the holding body 6, and the conductive porous members 7 are held by the holding portion 6.

The receptacle 9 has a treatment target water introduction portion 9a, through which treatment target water W1 is introduced into the receptacle 9, and a backwashing fluid introduction portion 9b, through which a backwashing fluid is introduced into the receptacle 9 from a direction differing from that of the treatment target water W1. Also, a predetermined amount of the conductive porous members 7 is loaded into the two space portions configured of the electrodes 2, the separator 5, and the holding body 6, whereby a layer of the conductive porous members 7 is formed, and a space 8 of a predetermined volume is formed above the layer of the conductive porous members 7. In the following description, a region configured of the electrodes 2, the separator 5, and the layer of the conductive porous members 7 in the receptacle 9 is called an "electrode portion".

That is, the receptacle 9 has the space 8, in which the conductive porous members 7 are not disposed, in one portion of the same spaces as the spaces in which the conductive porous members are disposed. The space 8 is provided between the conductive porous members 7 and the treatment target water introduction portion 9a. The volume of the space 8, being a volume needed in order that the conductive porous members 7 can expand due to fluidity, and are sufficiently agitated, when backwashing is carried out, is 1% to 50%, or more desirably 5% to 35%, of a volume or the conductive porous members 7.

A corrosion-resistant metal such as titanium, stainless steel, or platinum, or a chemically staple conductive material such as a carbon sheet or a carbon fiber sheet, is used for the electrodes 2. An electrically insulating, water permeable porous material such as filter paper, a non-woven fabric, a foamed material, or a porous film is used for the separator 5. An insulating sealing member, a frame member, or the like, is preferably disposed on a periphery of the separator 5, forming a structure joined to both the electrodes 2 and the holding body 6. A mesh size of the separator 5 is preferably smaller than a grain diameter of granular activated carbon in order to maintain insulation. Also, a thickness of the separator 5 is not particularly limited, but is arbitrarily selected from a range of, for example, 0.05 mm to 10 mm.

A porous material with high water permeability is used for the holding body 6. As the holding body 6 needs to secure insulation with the electrodes 2, an insulating material is selected. Alternatively, a sealing member or a frame member formed of an insulating material is disposed between the holding body 6 and the electrodes 2. Furthermore, a structure wherein the electrodes 2, the separator 5, and the holding body 6 are integrally joined may be adopted, and the electrodes 2 may be configured as one portion of the receptacle 9. Also, a holding body the same as the holding body 6 installed in a lower portion of the receptacle 9 may be provided in an upper end portion of the space 8.

A porous, conductive material with a high ion adsorption capacity, such as granular activated carbon, fibrous activated carbon, pellet form activated carbon, or powdered activated carbon, is used for the conductive porous members 7. A grain diameter such that the conductive porous members 7 do not pass through the separator 5 or the holding body 6, and a form near a spherical form that is unlikely to cause clogging of the separator 5 or holding body 6, are selected as the grain diameter and form of the conductive porous members 7. In particular, granular activated carbon of a coal base, a coconut husk base, a wood base, or the like, is preferably used. An average grain diameter of the activated carbon is 0.1 mm to 5 mm, or more desirably, 0.3 mm to 2.5 mm.

Owing to the heretofore described kind of configuration being adopted, the conductive porous members 7 do not pass through the separator 5 or the holding body 6, because of which insulation between the electrodes 2a and 2b is maintained. Also, by the holding body 6 also being provided above the electrode portion, the conductive porous members 7 can be prevented from flowing out from the receptacle 9 via a backwashing fluid discharge pipe 19 when backwashing is carried out.

In the first embodiment, the cylindrical electrode 2 is divided into two in an axial direction by the separator 5, but the cylindrical electrode 2 can be more finely divided. In this case, the electrode 2 is preferably divided into an even number or portions, and when divided into four or more portions, positive electrodes and negative electrodes are preferably disposed alternately. Also, the electrode 2 may be divided in a vertical direction in the axial direction, and in this case too, positive electrodes and negative electrodes are preferably disposed alternately. By so doing, the treatment target water W1 is treated alternately by the conductive porous member 7a on the positive electrode side and the conductive porous member 7b on the negative electrode side when flowing in the axial direction, because of which ions are efficiently removed from the treatment target water W1.

The overall configuration of the water treatment device 1 according to the first embodiment will be described, using FIG. 3. A treatment target water introduction pipe 12 is connected via treatment target water introduction means 13 to a treatment target water tank 11, in which the treatment target water W1 is stored, and the treatment target water introduction portion 9a in an upper portion of the receptacle 9. The treatment target water introduction means 13 is, for example, a liquid feeding pump.

The lower portion of the receptacle 9 is connected via a desalinated water discharge pipe 14 to a desalinated water tank 15, and treated water W2, which is the treatment target water W1 after being treated, is stored in the desalinated water tank 15. The desalinated water discharge pipe 14 includes a switching valve 14a. Also, a backwashing fluid introduction pipe 16 is connected via backwashing fluid introduction means 17 and the desalinated water discharge pipe 14 above the switching valve 14a to the desalinated water tank 15 and the backwashing fluid introduction portion 9b. The backwashing fluid introduction means 17 is, for example, a liquid feeding pump.

The backwashing fluid introduction portion 9b may be provided in a place differing from a place in which the receptacle 9 and the desalinated water discharge pipe 14 are connected. Also, the desalinated water discharge pipe 14 and the backwashing fluid introduction pipe 16 may be switched with the switching valve 14a as a passage switching valve.

The backwashing fluid discharge pipe 19 for discharging backwashing water W3, which is a backwashing fluid, is connected to the upper portion of the receptacle 9. A place in which the backwashing fluid discharge pipe 19 is connected to the receptacle 9 may be shared with the treatment target water introduction portion 9a. A valve may be disposed in each of the treatment target water introduction pipe 12, the backwashing fluid introduction pipe 16, and the backwashing fluid discharge pipe 19, and a water flow controlled by an opening and closing of the values. A configuration such that either or both of the treatment target water tank 11 and the desalinated water tank 15 are not installed may be adopted.

Also, in the example shown in FIG. 3, the treated water W2 is used as the backwashing fluid, but the backwashing fluid, not being limited to this, is selected from water, gas, a mixture thereof, or the like. When water is used as the backwashing fluid, the treatment target water W1 or the treated wafer W2 is desirably used, but water may also be separately introduced from the exterior of the water treatment device 1. When a gas such as air, nitrogen gas, oxygen gas, or the like, is used as the backwashing fluid, gas supplying equipment such as a gas canister or a compressor is used for the backwashing fluid introduction means 17. By a mixture of water and gas being used as the backwashing fluid, air bubbles collide with the electrodes 2, the separator 5, or the conductive porous members 7, whereby a detachment of scale or a biofilm is promoted.

Furthermore, the water treatment device 1 according to the first embodiment, in addition to being used alone with an object of a desalination process, can also be configured as, for example, the kind of water treatment system shown in FIG. 4. The water treatment system shown in FIG. 4 includes, in addition to the water treatment device 1, a biological treatment device 20, an ozone treatment device 21, a reverse osmosis membrane treatment device 22, and an advanced oxidation treatment device 23. Treatment target water introduction pipes 12a, 12b, and 12c are connected via the biological treatment device 20 and the ozone treatment device 21 to the water treatment device 1, and desalinated water discharge pipes 14b, 14c, and 14d are connected via the reverse osmosis membrane treatment device 22 and the advanced oxidation treatment device 23 to the water treatment device 1.

Also, the water treatment system may be of a configuration such that any one or more devices selected from the biological treatment device 20, the ozone treatment device 21, the reverse osmosis membrane treatment device 22, and the advanced oxidation treatment device 23 are added to the water treatment device 1. The order in which the water treatment device 1 and the reverse osmosis membrane treatment device 22 are disposed may be reversed. A device that combines a standard activated sludge method and sand filtration, a membrane separation bioreactor, or the like, is used for the biological treatment device 20. Also, commonly known technology can be used for the ozone treatment device 21, the reverse osmosis membrane treatment device 22, and the advanced oxidation treatment device 23.

Next, an operation of the water treatment device according to the first embodiment will be described, divided into an adsorption step of causing ions included in the treatment target water W1 to be adsorbed to the conductive porous members 7, and a desorption step of releasing a charge accumulated between the electrodes 2a and 2b, thereby causing ions adsorbed to the conductive porous members 7 to be desorbed. In the adsorption step, a voltage is applied between the electrodes 2a and 2b from the direct current power supply 4 via the electrode terminals 3, and with the switching valve 14a in an opened state, the treatment target water W1 stored in the treatment target water tank 11 is introduced into the electrode portion from the treatment target water introduction portion 9a using the treatment target water introduction means 13.

The treatment target water W1 in which various kinds of ion such as sodium ions ($Na^+$), calcium ions ($Ca^{2+}$), chlorine ions ($Cl^-$), or nitrate ions ($NO^{3-}$) are included passes through the conductive porous members 7 layer of the electrode portion. At this time, a voltage of 0.4 V to 5 V, desirably 0.4 V to 1.3 V, is applied between the electrodes 2a and 2b from the direct current power supply 4, whereby the ions are adsorbed to the conductive porous members 7. The kind of ion differs depending on the quality and the like of the treatment target water W1, and is not particularly limited.

Cations, such as sodium ions or calcium ions, are adsorbed to the conductive porous member 7b on the negative electrode 2b side, and anions, such as chlorine ions or nitrate ions, are absorbed to the conductive porous member 7a on the positive electrode 2a side. Because of this, the treatment target water W1 is desalinated while flowing down through the conductive porous members 7 layer. The treated water W2 after treatment passes through the holding body 6, passes through the desalinated water discharge pipe 14 from the lower portion of the receptacle 9, and is stored in the desalinated water tank 15.

Meanwhile, the desorption step is carried out when the ion adsorption capacity of the conductive porous members 7 decreases. In the first embodiment, backwashing of the conductive porous members 7 is carried out simultaneously with the desorption step, and the treated water W2 stored in the desalinated water tank 15 is used as the backwashing fluid. In the desorption step, the switching valve 14a is closed and, in a state wherein the electrodes 2a and 2b are short-circuited (or a reverse voltage is applied to the electrodes 2a and 2b), the treated water W2 stored in the desalinated water tank 15 is introduced into the receptacle 9 from the backwashing fluid introduction portion 9b of the lower portion of the receptacle 9, using the backwashing fluid introduction means 17.

When the treated water W2, which is the backwashing fluid, is introduced into the electrode portion from the lower portion of the receptacle 9, the conductive porous members 7 expand and flow so as to leap upward owing to the treated water W2 because the space 8 is provided above the conductive porous members 7, and desorption of ions adsorbed to the conductive porous members 7 is promoted. Furthermore, grains of the agitated conductive porous members 7 collide with other grains of the conductive porous members 7 or with the electrodes 2 or the separator 5, whereby scale or a biofilm appearing on the surfaces of the grains of the conductive porous members 7, the electrodes 2, or the separator 5 is mechanically detached. Also, owing to the backwashing, impurities accumulated on surfaces of the conductive porous members 7 facing the space 8 are discharged to the exterior of the receptacle 9 via the backwashing fluid discharge pipe 19, and clogging of the conductive porous members 7 is eliminated.

A flow speed of the backwashing fluid for backwashing the conductive porous members 7 is a speed sufficient for the conductive porous members 7 layer to expand and the conductive porous members 7 to be fluidized. For example, when granular activated carbon is used for the conductive porous members 7, a linear speed of the backwashing fluid is 0.002 $m^3/(min \cdot m^2)$ to 0.8 $m^3/(min \cdot m^2)$, or more desirably 0.01 $m^3/(min \cdot m^2)$ to 0.2 $m^3/(min \cdot m^2)$, whereby the desorption step can be carried out efficiently.

A description has been given here of a case in which backwashing of the conductive porous members 7 is carried out simultaneously with the desorption step, but backwashing of the conductive porous members 7 may be implemented separately from the desorption step. However, by the backwashing fluid being introduced into the electrode portion from a direction differing from that of the treatment target water W1, an electric double layer is eliminated, and the desorption of ions from the conductive porous members 7 is promoted, because of which time taken for the adsorption step is shortened.

Also, in the first embodiment, a case in which the treatment target water introduction portion 9a is provided in the upper portion of the receptacle 9 is given as an example, but a treatment target water introduction portion may be provided in the lower portion of the receptacle 9, and the treatment target water W1 may be introduced from below the electrode portion in the adsorption step. An electrical field changes gradually from the positive electrode toward the negative electrode between the electrodes 2a and 2b, because of which the conductive porous members 7 in a vicinity of the electrodes 2 adsorb ions more easily than the conductive porous members 7 in a vicinity of the separator 5, and variation occurs in the amount of ions adsorbed by the conductive porous members 7.

In response to this kind of problem, the treatment target water W1 is introduced from below the electrode portion in the adsorption step, whereby the conductive porous members 7 in a vicinity of the electrodes 2 can be moved to a vicinity of the separator 5, and the conductive porous members 7 in a vicinity of the separator 5 can be moved to a vicinity of the electrodes 2, owing to the fluidity of the conductive porous member 7. Because of this, variation in the amount of ions adsorbed by the conductive porous members 7 in the electrode portion is eliminated, and the amount of ions adsorbed overall can be increased.

The water treatment device 1 according to the first embodiment can be of a configuration that includes two or more of a wafer treatment unit configured of the pair of electrodes 2, the separator 5, the conductive porous members 7, and the receptacle 9. In this case, the electrodes 2 of each water treatment unit may be connected using a switching circuit (omitted from the drawings), and a charge accumulated between the electrodes 2a and 2b of a water treatment unit in which the desorption step is carried out may be supplied to the electrodes 2 of a water treatment unit in which the adsorption step is carried out. Because of this, a voltage is applied between the electrodes 2a and 2b of a water treatment unit in which the adsorption step is started, and used as electrical energy needed for the desalination process.

According to the water treatment device and water treatment method according to the first embodiment, as heretofore described, the space 8 in which the conductive porous members 7 are not disposed is provided in one portion of the same spaces in the receptacle 9 as the spaces in which the conductive porous members 7 are disposed, the backwashing fluid is introduced into the electrode portion in the receptacle 9 from a direction differing from that of the treatment target water W1, and the conductive porous members 7 are caused to flow, whereby the grains of the conductive porous members 7 are agitated, and collide with other grains of the conductive porous members 7 or with the electrodes 2 or the separator 5, because of which scale and a biofilm appearing on the surfaces of the grains of the conductive porous members 7, the electrodes 2, or the separator 5 can be easily removed, and desalination efficiency can be maintained.

Also, by the conductive porous members 7 being sufficiently agitated, the desorption of ions adsorbed to the conductive porous members 7 is prompted, and the time needed for the desorption step can be shortened in comparison with that needed to date. Furthermore, by an appropriate size being adopted for the volume of the space 8, leakage of the conductive porous members 7 when backwashing can be restricted, and clogging of the conductive porous members 7 is eliminated by the backwashing. According to the first embodiment, for the above reasons, a water treatment device such that maintenance is easy, and ion adsorption capacity, that is, desalination efficiency, can be maintained, is obtained.

Also, as a configuration including a multiple of water treatment units, a charge accumulated in a water treatment unit in which the desorption step is carried out is supplied to a water treatment unit in which the adsorption step is carried out, whereby power can be recovered, and the amount of power consumption needed for driving can be restricted.

Second Embodiment

Figure 5:
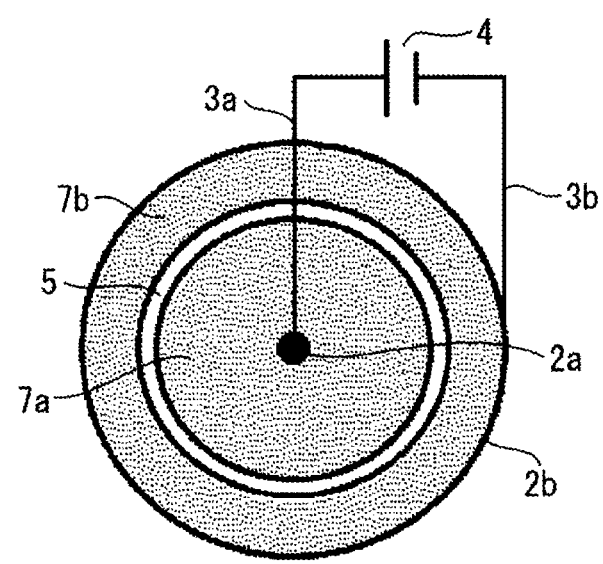
FIG. 5 is a sectional view showing a main configuration of a water treatment device according to a second embodiment of the invention.
Figure 6:
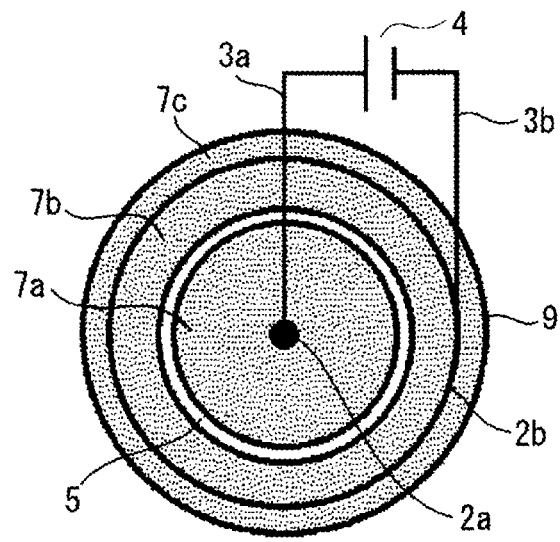
FIG. 6 is a sectional view showing a modified example of the water treatment device according to the second embodiment of the invention.

FIG. 5 is a diagram schematically showing a main configuration of a water treatment device according to a second embodiment of the invention, and FIG. 6 is a diagram showing a modified example of the water treatment device shown in FIG. 5. The water treatment device according to the second embodiment is such that the pair of electrodes 2 and the separator 5 are disposed in concentric circles. In the second embodiment too, in the same way as in the first embodiment, a treatment target water introduction portion is provided above the conductive porous members 7 layer, and a space for allowing the conductive porous members 7 to flow when backwashing is provided between the conductive porous members 7 and the treatment target water introduction portion.

The water treatment device according to the second embodiment includes a cylindrical electrode (the electrode 2b), and a central electrode (the electrode 2a) provided on an inner side of the cylindrical electrode and coaxial with the cylindrical electrode, as the pair of electrodes 2. The separator 5 of a cylindrical form is disposed coaxially with the cylindrical electrode between the cylindrical electrode and the central electrode. The central electrode and the cylindrical electrode are connected by insulated wires to the direct current power supply 4 via the electrode terminals 3a and 3b respectively.

Also, in the modified example shown in FIG. 6, the receptacle 9 of a cylindrical form is also deposited coaxially on an outer side of the cylindrical electrode of the water treatment device shown in FIG. 5, and a conductive porous member 7c is also disposed in a gap portion between the cylindrical electrode and the receptacle 9. The modified example is such that by the receptacle 9 being provided on the outer side of the cylindrical electrode, insulation of a device outer peripheral portion is maintained. Also, by the conductive porous member 7c being deposited between the cylindrical electrode and the receptacle 9, the amount of the conductive porous members 7 held in the water treatment device 1 increases, and the frequency of replenishing or replacing the conductive porous members 7 can be reduced. As other configurations are the same as in the first embodiment, a description will be omitted.

According to the second embodiment, in addition to the same advantages as in the first embodiment, the cylindrical electrode can be used as one portion of the receptacle 9 by the central electrode, the separator 5, and the cylindrical electrode being disposed concentrically, and assembly of the water treatment device becomes easier. Also, by an annular structure being adopted for the electrode portion, a dead water region is less likely to form than in a case of a rectangular cuboid reaction tank, and the desalination process can be carried out efficiently. Also, the conductive porous member 7a in a vicinity of the rod-form central electrode is easily agitated by the backwashing fluid, because of which miscibility of the conductive porous member 7a increases, and the electrode portion can be backwashed efficiently.

Third Embodiment

Figure 7:
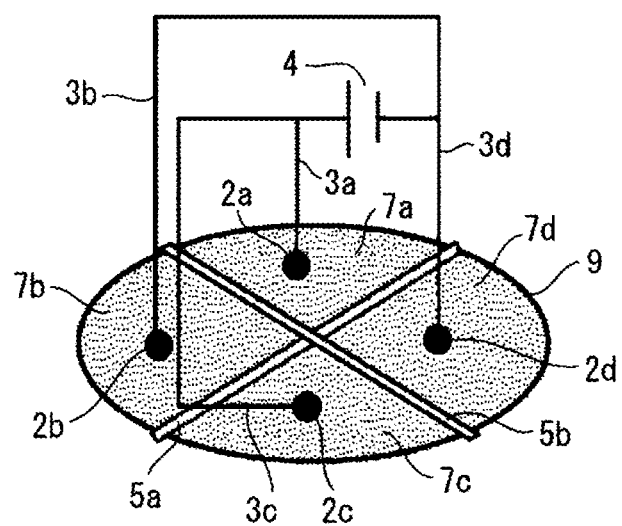
FIG. 7 is a diagram showing a main configuration in a horizontal cross-section of a water treatment device according to a third embodiment of the invention.

FIG. 7 is a perspective view schematically showing a main configuration in a horizontal cross-section of a water treatment device according to a third embodiment of the invention. The water treatment device according to the third embodiment includes two pairs of rod-form electrodes 2a, 2b, 2c, and 2d (collectively referred to as the electrodes 2). The receptacle 9 is compartmentalized into four spaces by two orthogonal separators 5a and 5b, and the electrodes 2 are disposed one in each of the four spaces at equal intervals from each other. In the third embodiment too, in the same way as in the first embodiment, a treatment target water introduction portion is provided above the conductive porous members 7 layer, and a space for allowing the conductive porous members 7 to flow when backwashing is provided between the conductive porous members 7 and the treatment target water introduction portion.

The electrodes 2 are disposed at equal angles (90°) in a peripheral direction in an interior of the cylindrical receptacle 9 so that the intervals between the electrodes 2 are equal, and the separators 5a and 5b that partition the electrodes 2 off from each other are disposed between the electrodes 2 in a radial form so as to pass through a central portion. The electrodes 2a and 2c are connected via electrode terminals 3a and 3c to a positive electrode of the direct current power supply 4, and the electrodes 2b and 2d are connected via electrode terminals 3b and 3d to a negative electrode of the direct current power supply 4. As other configurations are the same as in the first embodiment, a description will be omitted.

In the third embodiment, the form of the receptacle 9, not being limited to a cylindrical form, can be arbitrarily configured as, for example, a polygonal tube form, a tube form wherein a curved line such as an arc and a straight line are combined, a rectangular cuboid, or the like. Also, the water treatment device may be caused to operate as two mutually independent water treatment units, with the electrodes 2a and 2b as a pair, and the electrodes 2c and 2d as another pair.

According to the third embodiment, in addition to the same advantages as in the first embodiment, treatment target water flows more easily inside the receptacle 9 owing to the two pairs of rod-form electrodes 2 being disposed at equal intervals in the peripheral direction in the cylindrical receptacle 9. Also, by the electrodes 2 being disposed uniformly, ions are efficiently removed from the treatment target water.

Fourth Embodiment

Figure 8:
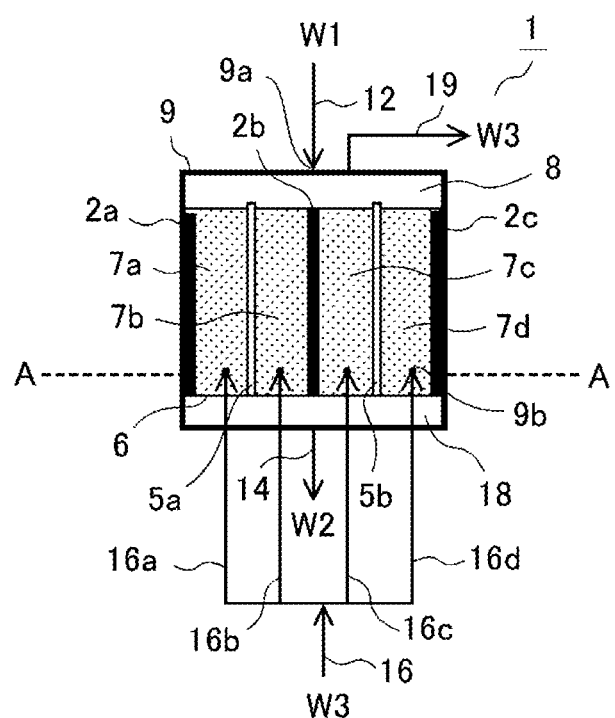
FIG. 8 is a sectional view showing a main configuration of a water treatment device according to a fourth embodiment of the invention.
Figure 9:
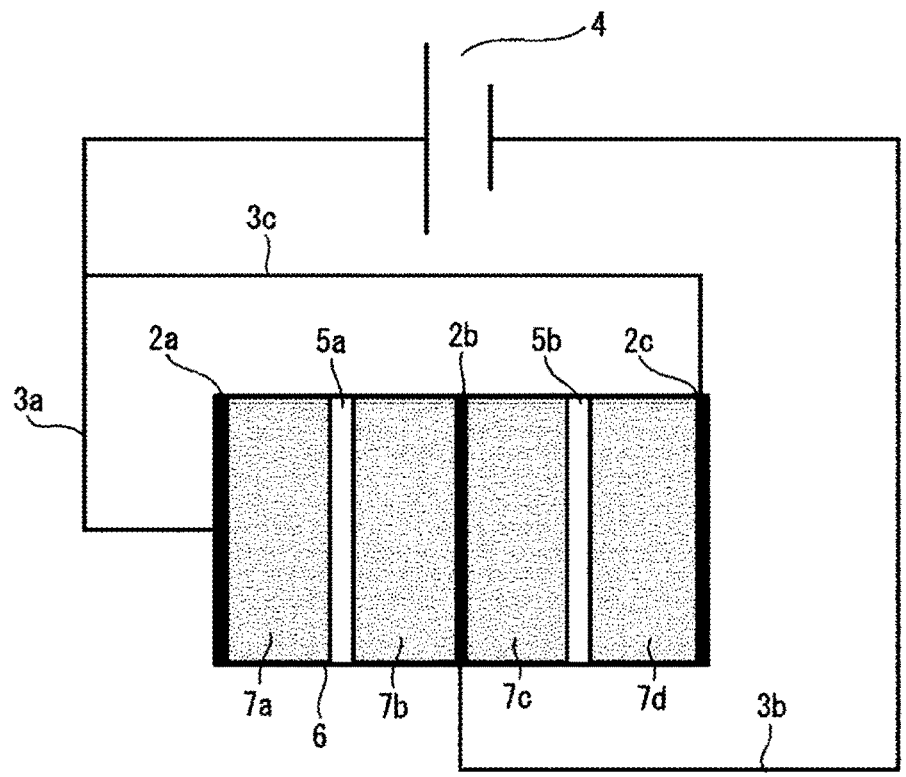
FIG. 9 is a sectional view showing a main configuration of the water treatment device according to the fourth embodiment of the invention.

FIG. 8 is a sectional view schematically showing a main configuration of a water treatment device according to a fourth embodiment of the invention, and FIG. 9 is a diagram of a cross-section indicated by A-A in FIG. 8 seen from above. The water treatment device 1 according to the fourth embodiment includes three plate-form electrodes 2a, 2b, and 2c (collectively referred to as the electrodes 2) disposed parallel to each other and at equal intervals, and the two separators 5a and 5b disposed parallel to the electrodes 2.

The electrode 2b disposed in a center is a common electrode, and has a polarity differing from that of the electrodes 2a and 2c on either side. That is, two desalination process portions are configured, with the electrode 2b in a central portion as the common electrode. In the example shown in FIG. 9, the electrodes 2a and 2c are connected via the electrode terminals 3a and 3c to the positive electrode of the direct current power supply 4, and the electrode 2b is connected via the electrode terminal 3b to the negative electrode of the direct current power supply 4. Each electrode 2 and the direct current power supply 4 may be connected through the space 8, or may be connected through a side face of the receptacle 9.

A predetermined amount of conductive porous members 7a, 7b, 7c, and 7d (collectively referred to as the conductive porous members 7) is loaded into gaps between the electrodes 2 and the separators 5a and 5b, whereby the conductive porous members 7 layer is formed. Also, in the same way as in the first embodiment, the treatment target water introduction portion 9a is provided above the conductive porous members 7 layer, and the space 8 for allowing the conductive porous members 7 to flow when backwashing is provided between the conductive porous members 7 and the treatment target water introduction portion 9a.

In the fourth embodiment, as shown in FIG. 8, backwashing fluid introduction pipes 16a, 16b, 16c, and 16d (collectively referred to as backwashing fluid introduction pipes 16) are connected to a lower portion of the side surface of the receptacle 9. Also, a lower space 18 is provided below the holding body 6 that holds the conductive porous members 7. As other configurations are the same as in the first embodiment, a description will be omitted.

According to the fourth embodiment, in addition to the same advantages as in the first embodiment, the three plate-form electrodes 2 and the two separators 5a and 5b are disposed at equal intervals, configuring two desalination process portions with the electrode 2b in the central portion as the common electrode, because of which a reduction in size of the electrode portion is achieved, and a reduction of space needed for an installation place is achieved.

Also, by the backwashing fluid being introduced from a side face of the conductive porous members 7 layer, the conductive porous members 7 layer flows unevenly, and scale or the like adhering to the conductive porous members 7 layer is easily removed. Also, as the lower space 18 is provided below the holding body 6, the backwashing fluid rises through the electrode portion in a state wherein the lower space 18 is filled with the backwashing fluid when the backwashing fluid is introduced into the electrode portion when backwashing, because of which the backwashing fluid easily flows uniformly through the electrode portion.

Fifth Embodiment

Figure 10:
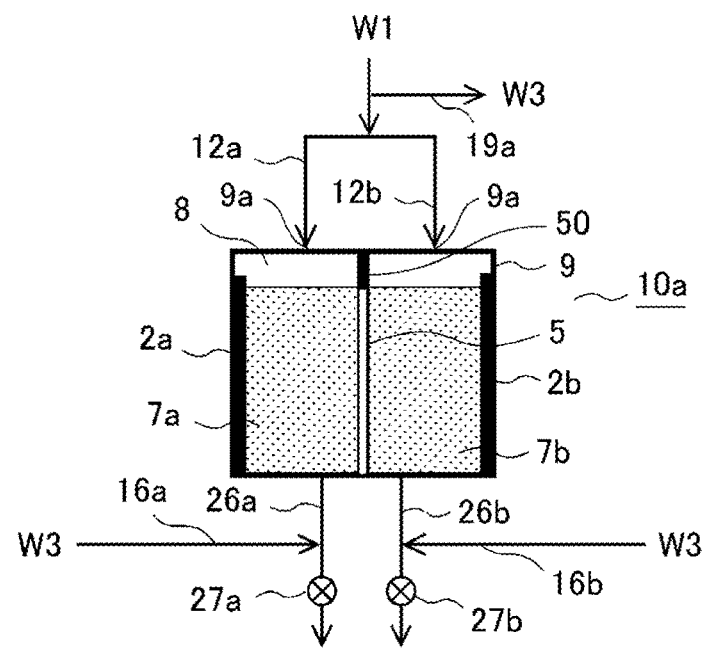
FIG. 10 is a diagram showing a configuration of a first stage water treatment unit of a water treatment device according to a fifth embodiment of the invention.
Figure 11:
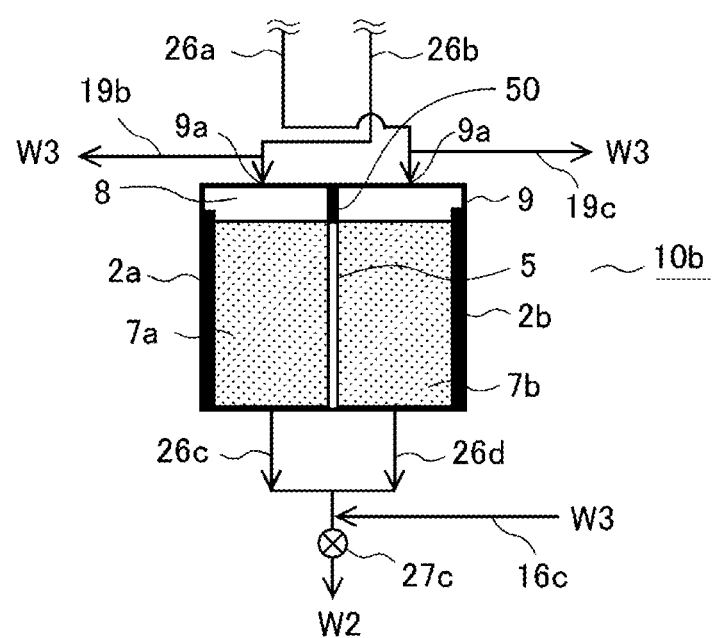
FIG. 11 is a diagram showing a configuration of a second stage water treatment unit of the water treatment device according to the fifth embodiment of the invention.

FIG. 10 is a schematic view showing a configuration of a first stage water treatment unit of a water treatment device according to a fifth embodiment of the invention, and FIG. 11 is a schematic view showing a configuration of a second stage water treatment unit connected to the water treatment unit shown in FIG. 10. The water treatment device according to the fifth embodiment includes a multiple of water treatment units 10a and 10b, which include a pair of the electrodes 2, the separator 5, the conductive porous members 7, and the receptacle 9, connected in series.

Each water treatment unit 10a and 10b is such that the treatment target water introduction portion 9a is provided above the conductive porous members 7 layer, and the space 8 for allowing the conductive porous members 7 to flow when backwashing is provided between the conductive porous members 7 and the treatment target water introduction portion 9a.

In the first stage water treatment unit 10a, the treatment target water W1 is introduced into the conductive porous members 7a and 7b via the treatment target water introduction pipes 12a and 12b respectively. At this time, switching valves 27a, 27b, and 27c are opened. Treated water treated by the conductive porous member 7a on the positive electrode side and treated water treated by the conductive porous member 7b on the negative electrode side are recovered separately, and introduced so as to be treated in the second stage water treatment unit 10b by the conductive porous members 7b and 7a respectively, which are of polarities the reverse of those in the first stage water treatment unit 10a.

That is, the treated water treated by the conductive porous member 7a on the positive electrode side of the first stage water treatment unit 10a is introduced via a desalinated water discharge pipe 26a into the conductive porous member 7b on the negative electrode side of the second stage water treatment unit 10b. Also, the treated water treated by the conductive porous member 7b on the negative electrode side of the first stage water treatment unit 10a is introduced via a desalinated water discharge pipe 26b into the conductive porous member 7a on the positive electrode side of the second stage water treatment unit 10b.

Also, a partitioning plate 50 that does not allow water to pass through is disposed above the separator 5 of each of the water treatment units 10a and 10b. Because of this, treated water on the positive electrode sides and the negative electrode sides of the water treatment units 10a and 10b can be prevented from mixing. The treatment target water introduction pipes 12a and 12b may be of a configuration that does not branch, or may be of a configuration that branches into two or more.

The backwashing fluid introduction pipes 16a and 16b are connected further than the switching valves 27a and 27b to the water treatment unit 10a side of the desalinated water discharge pipes 26a and 26b of the first stage water treatment unit 10a. Also, the backwashing fluid introduction pipe 16c is connected further than the switching valve 27c to the water treatment unit 10b side of a pipe in which desalinated water discharge pipes 26c and 26d of the second stage water treatment unit 10b meet. Backwashing fluid discharge pipes 19a, 19b, and 19c are connected respectively to the treatment target water introduction pipes 12 in the first stage water treatment unit 10a and the desalinated water discharge pipes 26a and 26b in the second stage water treatment unit 10b.

Also, the backwashing fluid discharge pipes 19b and 19c of the water treatment unit 10b are connected further than the switching valves 27b and 27a to the water treatment unit 10b side of the desalinated water discharge pipes 26b and 26a respectively. A configuration may be such that each of the backwashing fluid discharge pipes 19 is directly connected to the receptacle 9 above the space 8 in the first stage water treatment unit 10a and the second stage water treatment unit 10b.

A flow of water in the desorption step of the water treatment device according to the fifth embodiment will be described. In the desorption step of the first stage water treatment unit 10a, the backwashing water W3, which is the backwashing fluid, is introduced into the electrode portion via the backwashing fluid introduction pipes 16a and 16b and the desalinated water discharge pipes 26a and 26b using backwashing fluid introduction means (omitted from the drawings), in a state wherein the switching valves 27a and 27b are closed. The backwashing water W3, after causing the conductive porous members 7 of the electrode portion to flow, is discharged from the backwashing fluid discharge pipe 19a via the treatment target water introduction pipes 12a and 12b.

Also, in the desorption step of the second stage water treatment unit 10b, the backwashing water W3, which is the backwashing fluid, is introduced into the electrode portion via the backwashing fluid introduction pipe 16c and the desalinated water discharge pipes 26c and 26d using backwashing fluid introduction means (omitted from the drawings), in a state wherein the switching valve 27c is closed. The backwashing water W3, after causing the conductive porous members 7 of the electrode portion to flow, is discharged from the backwashing fluid discharge pipes 19b and 19c via the desalinated water discharge pipes 26a and 26b.

A configuration may also be such that the switching valves 27a and 27b, the backwashing fluid introduction pipes 16a and 16b, and the backwashing fluid discharge pipes 19b and 19c are not disposed in the desalinated water discharge pipes 26a and 26b disposed between the first stage water treatment unit 10a and the second stage water treatment unit 10b. In this case, the backwashing fluid led into the second stage water treatment unit 10b is introduced into the first stage water treatment unit 10a via the desalinated water discharge pipes 26a and 26b, and discharged from the backwashing fluid discharge pipe 19a via the treatment target water introduction pipes 12a and 12b. By adopting this kind of configuration, a simplification of the device piping is achieved, and the amount of backwashing fluid can be reduced.

In the example shown in FIG. 10 and FIG. 11, the treatment target water is introduced in the second stage water treatment unit 10b into the conductive porous members 7 of a polarity the reverse of that in the first stage by the desalinated water discharge pipes 26a and 26b connected to the first stage water treatment unit 10a being caused to cross, but a disposition may be such that the polarities of the electrodes 2 of the second stage water treatment unit 10b are the reverse in a left-right direction of those of the electrodes 2 of the first stage water treatment unit 10a, without the desalinated water discharge pipes 26a and 26b being caused to cross.

Herein, a case in which the two water treatment units 10a and 10b are disposed in series has been described, but a configuration wherein three or more water treatment units are disposed in series may be adopted. In this case, a water treatment unit connected to a last stage is of the configuration shown in FIG. 11, other water treatment units are of the configuration shown in FIG. 10, and the desalinated water discharge pipes 26a and 26b are connected instead of the treatment target water introduction pipes 12a and 12b in the water treatment units from the second stage to the second last stage.

According to the fifth embodiment, in addition to the same advantages as in the first embodiment, a multiple of water treatment units are connected in series, the treated water treated by the conductive porous member 7a on the positive electrode side of the first stage water treatment unit and the treated water treated by the conductive porous member 7b on the negative electrode side are recovered separately, and are supplied to the second stage water treatment unit 10b into the conductive porous members 7 of polarities the reverse of those in the first stage, because of which ions can be efficiently removed.

Sixth Embodiment

Figure 12:
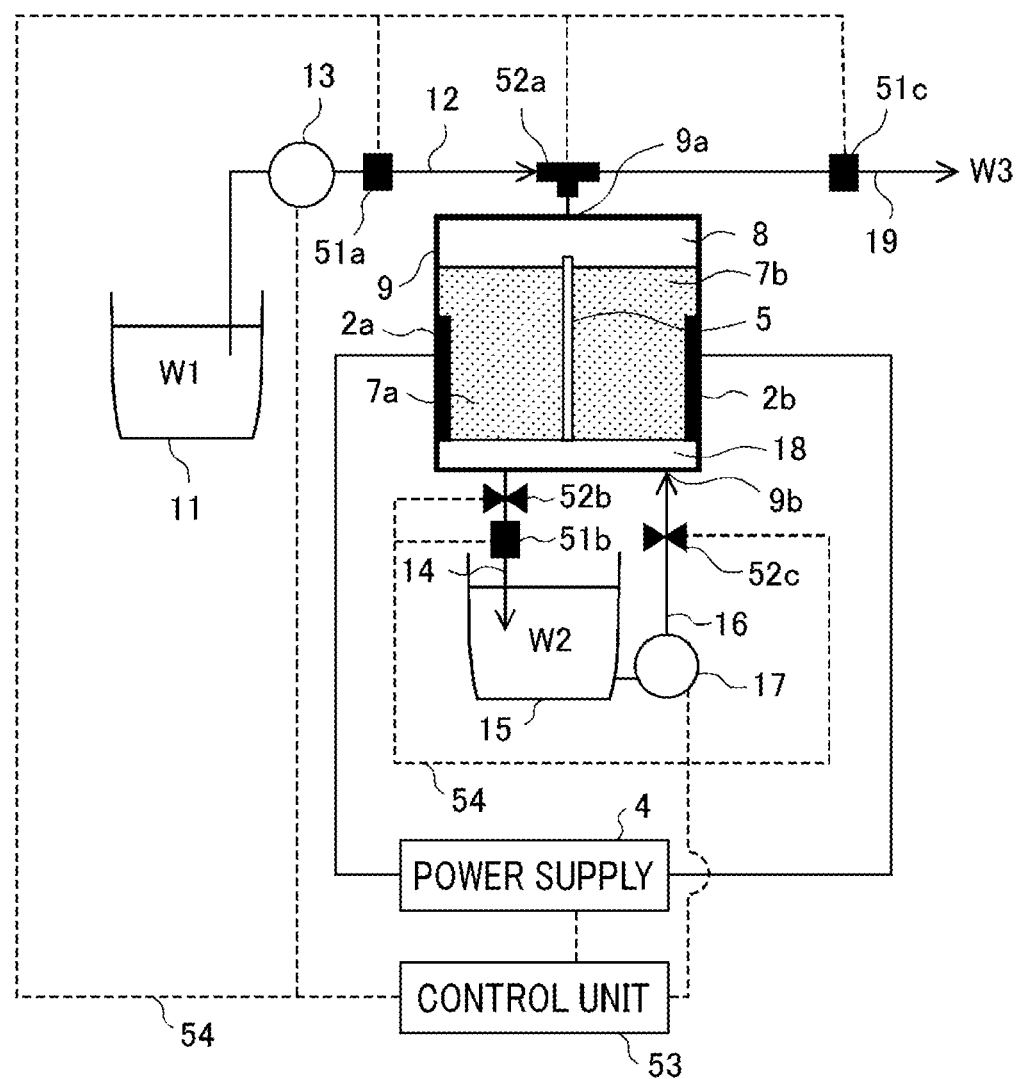
FIG. 12 is a diagram showing an overall configuration of a water treatment device according to a sixth embodiment of the invention.
Figure 13:
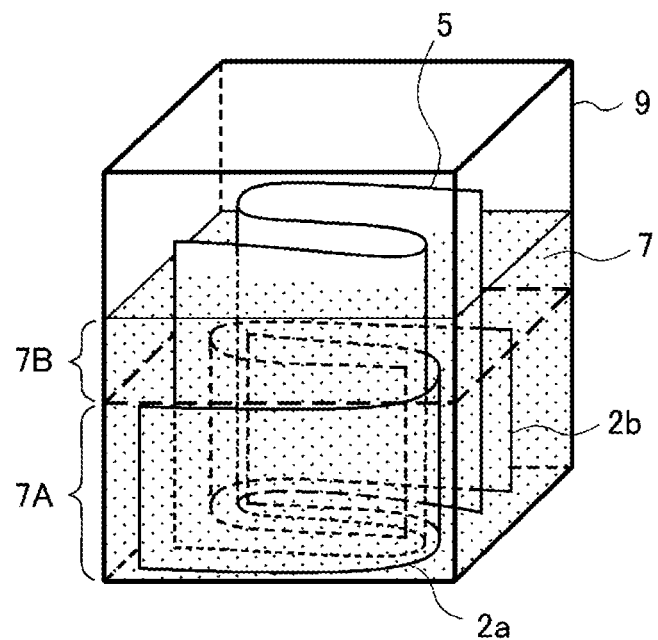
FIG. 13 is a perspective view showing a main configuration of the water treatment device according to the sixth embodiment of the invention.
Figure 14:
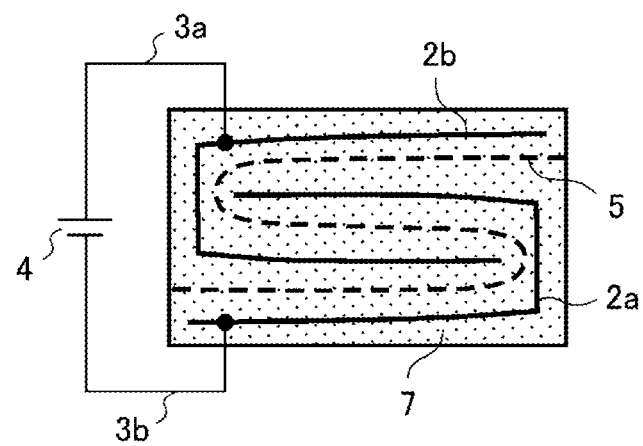
FIG. 14 is a sectional view showing a main configuration of the water treatment device according to the sixth embodiment of the invention.

FIG. 12 is a diagram schematically showing an overall configuration of a water treatment device according to a sixth embodiment of the invention, and FIG. 13 and FIG. 14 are a perspective view and a horizontal sectional view schematically showing a main configuration of the water treatment device according to the sixth embodiment. The water treatment device according to the sixth embodiment includes a first sensor 51a, a second sensor 51b, and a third sensor 51c (collectively referred to as sensors 51), which detect ion concentrations of the treatment target water W1, the treated water W2, and the backwashing water W3 after backwashing respectively, and a control unit 53 that acquires results of detections by the sensors 51, and controls switching of a first valve 52a, a second valve 52b, and a third valve 52c (collectively referred to as valves 52), and an application of voltage between the electrodes 2a and 2b.

The first sensor 51a and the first valve 52a are provided in the treatment target water introduction pipe 12. The first valve 52a, is a switching valve that selects either a channel along which the treatment target water W1 is introduced into the receptacle 9 via the treatment target water introduction pipe 12, or a channel along which the backwashing water W3 after backwashing is discharged from the receptacle 9 via the backwashing fluid discharge pipe 19.

Also, the second valve 52b and the second sensor 51b are provided in the desalinated water discharge pipe 14, and the third valve 52c is provided in the backwashing fluid introduction pipe 16. In the example shown in FIG. 12, the backwashing fluid introduction pipe 16 is connected to the desalinated water tank 15, but the backwashing fluid introduction pipe 16 may also be connected further than the second valve 52b to the receptacle 9 side of the desalinated water discharge pipe 14. Also, the third valve 52c may be omitted by a channel switching valve being used as the second valve 52b, and the backwashing fluid introduction pipe 16 being connected directly to the second valve 52b. Also, a place in which the backwashing fluid discharge pipe 19 is connected may be a place other than the treatment target water introduction portion 9a, and a switching valve may be installed in each.

The control unit 53 is connected to the treatment target water introduction means 13, the sensor 51, the valve 52, the backwashing fluid introduction means 17, and the direct current power supply 4 via a control cable 54. In the adsorption step, the control unit 53 obtains a rate of ion removal by the conductive porous members 7 from the ion concentrations of the treatment target water W1 and the treated water W2 detected by the first sensor 51a and the second sensor 51b respectively. Also, in the desorption step, the control unit 53 obtains a rate of ion desorption from the conductive porous members 7 from the ion concentration of the backwashing water W3 detected by the third sensor 51c.

The sensors 51 are ion concentration measurement devices that use, for example, an ion electrode, and may detect a concentration of a specific metal ion in accordance with an object. Furthermore, the sensors 51 may include a multiple of sensors, such as a sensor that detects a water quality such as a concentration of residual chlorine, residual agrochemical, and organic matter, or a sensor that detects a flow rate.

Also, the electrodes 2 and the separator 5 are all disposed in a vertical direction, and the conductive porous members 7 are disposed so that uppermost portions thereof are higher than the electrodes 2 and lower than the separator 5. Because of this, as shown in FIG. 13, a conductive porous member 7A of a region in which the electrodes 2 are disposed, and a conductive porous member 7B of a region in which the electrodes 2 are not disposed, exist in one water treatment device, ions are removed by the conductive porous member 7A in a lower layer, and organic matter is removed by the conductive porous member 7B in an upper layer.

Also, as shown in FIG. 14, each of the pair of electrodes 2 is of a sectional form having a depressed portion curved into a U-form, and one portion of the one electrode 2b is disposed in an interior of the depressed portion of the other electrode 2a. The separator 5 is disposed in a sack-like form on a periphery of the electrodes 2, preventing the conductive porous members 7 disposed on the positive electrode side and the negative electrode side from coming into contact and short-circuiting. As other configurations are the same as in the first embodiment, a description will be omitted.

Figure 15:
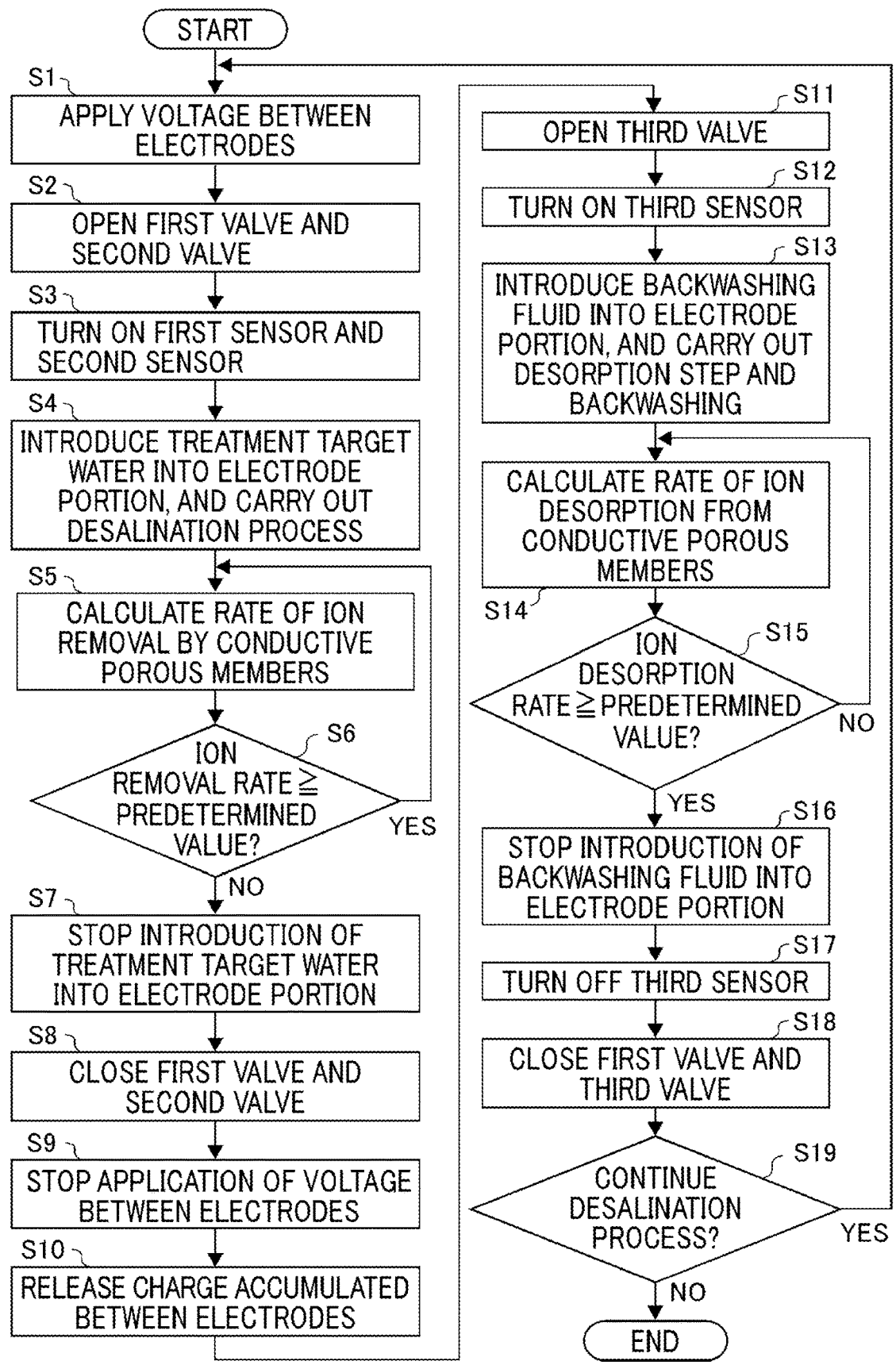
FIG. 15 is a diagram showing a process flow of the water treatment device according to the sixth embodiment of the invention.

A description will be given, using FIG. 12 and FIG. 15, of a process flow when alternately implementing the adsorption step, in which a desalination process is carried out, and the desorption step, in which the ion adsorption capacity of the conductive porous members 7 is caused to recover, in the water treatment device according to the sixth embodiment. The process shown in the flowchart of FIG. 15 is controlled by the control unit 53. The adsorption step is started in a state wherein all of the valves 52 are closed, and instruments such as the sensors 51 are in an off-state.

In step S1, voltage is applied between the electrodes 2a and 2b using the direct current power supply 4. Continuing, in step S2, the first valve 52a is opened in the direction of the treatment target water introduction pipe 12, thereby opening the treatment target water introduction pipe 12, and the second valve 52b is opened, thereby opening the desalinated water discharge pipe 14. Continuing, in step S3, the first sensor 51a and the second sensor 51b are turned on.

Continuing, in step S4, the treatment target water introduction means 13 is turned on, the treatment target water W1 stored in the treatment target water tank 11 is introduced into the electrode portion from the treatment target water introduction portion 9a via the treatment target water introduction pipe 12, and a desalination process is carried out. In the desalination process, an electric double layer is formed in the electrode portion, and ions in the treatment target water W1 are adsorbed to the conductive porous members 7. The desalinated treated water W2 is discharged from the lower portion of the receptacle via the desalinated water discharge pipe 14, and stored in the desalinated water tank 15.

Continuing, in step S5, the ion concentrations of the treatment target water W1 and the treated water W2 are detected by the first sensor 51a and the second sensor 51b respectively, and a rate of ion removal from the treatment target water W1 by the conductive porous members 7 is calculated based on the ion concentrations. When the ion removal rate is equal to or greater than a predetermined value (YES) in step S6, the adsorption step of step S5 is continued. Also, when the ion removal rate is lower than the predetermined value (NO) in step S6, it is determined that the ion adsorption capacity of the conductive porous members 7 is decreasing, and the process advances to step S7.

In step S7, the treatment target water introduction means 13 is turned off, thereby stopping the introduction of the treatment target water W1 into the electrode portion, and in step S8, the first valve 52a and the second valve 52b are closed. Continuing, in step S9, the application of voltage to the electrodes 2 is stopped, and in step S10, a charge accumulated between the electrodes 2a and 2b, that is, a charge accumulated in the conductive porous members 7, is released.

Subsequently, in step S11, the first valve 52a is opened in the direction of the backwashing fluid discharge pipe 19, thereby opening the backwashing fluid discharge pipe 19, and the third valve 52c is opened, thereby opening the backwashing fluid introduction pipe 16. Continuing, in step S12, the third sensor 51c is turned on, and in step S13, the backwashing fluid introduction means 17 is turned on, the backwashing fluid is introduced into the electrode portion from the backwashing fluid introduction portion 9b, and backwashing is carried out together with the desorption step.

Continuing, in step S14, the ion concentration of the backwashing water W3 after backwashing is detected by the third sensor 51c, and a rate of ion desorption from the conductive porous members 7 is calculated based on the ion concentration. When the ion desorption rate is lower than a predetermined value (NO) in step S15, the desorption step is continued. Also, when the ion desorption rate is equal to or greater than the predetermined value (YES) in step S15, it is determined that the ion adsorption capacity of the conductive porous members 7 has recovered, an the process advances to step S16.

In step S16, the backwashing fluid introduction means 17 is turned off, thereby stopping the introduction of the backwashing fluid into the electrode portion. Continuing, in step S17, the third sensor 51c is turned off. Furthermore, in step S18, the first valve 52a and the third valve 52c are closed. Subsequently, in step S19, it is determined whether or not to continue the desalination process, and when determining to continue (YES), the process returns to step S1. When determining in step S19 not to continue the desalination process (NO), the process is ended.

The necessity or otherwise of continuing the desalination process may also be determined in step S19 based on the amount of the treatment target water W1 in the treatment target water tank 11. In this case, the desalination process is continued when a predetermined amount or more of the treatment target water W1 is stored in the treatment target water tank 11. Alternatively, the adsorption step and the desorption step may be switched after a predetermined time, regardless of the results of the ion concentration detections by the sensors 51.

According to the sixth embodiment, in addition to the same advantages as in the first embodiment, the uppermost portions of the conductive porous members 7 are disposed so as to be higher than the electrodes 2, whereby ions can be removed by the conductive porous member 7A in the region in which the electrodes 2 are disposed, and organic matter can be removed by the conductive porous member 7B in the region in which the electrodes 2 are not disposed, meaning that ions and organic matter can be simultaneously removed.

Also, the ion concentrations of the treatment target water W1, the treated water W2, and the backwashing water W3 after backwashing are detected by the sensors 51, and the ion removal rate and the ion desorption rate of the conductive porous members 7 are obtained, because of which a switch can be made to the desorption step when the ion adsorption capacity of the conductive porous members 7 decreases in the adsorption step, and a switch can be made to the adsorption step when the ion adsorption capacity of the conductive porous members 7 recovers sufficiently in the desorption step. The embodiments can be freely combined, and each embodiment can be modified or abbreviated as appropriate, without departing from the scope of the invention.

REFERENCE SIGNS LIST

1 Water treatment device, 2, 2a, 2b, 2c, 2d Electrode, 3, 3a, 3b, 3c, 3d Electrode terminal, 4 Direct current power supply, 5, 5a, 5b Separator, 6 Holding body, 7, 7a, 7b, 7c, 7A, 7B Conductive porous member, 8 Space, 9 Receptacle, 9a Treatment target water introduction portion, 9b Backwashing fluid introduction portion, 10a, 10b Water treatment unit, 11 Treatment target water tank, 12, 12a, 12b Treatment target water introduction pipe, 13 Treatment target water introduction means, 14, 14b, 14c, 14d, 26, 26a, 26b, 26c, 26d Desalinated water discharge pipe, 14a Switching valve, 15 Desalinated water tank, 16, 16a, 16b, 16c, 16d Backwashing fluid introduction pipe, 17 Backwashing fluid introduction means, 18 Lower space, 19, 19a, 19b, 19c Backwashing fluid discharge pipe, 20 Biological treatment device, 21 Ozone treatment device, 22 Reverse osmosis membrane treatment device, 23 Advanced oxidation treatment device, 27a, 27b, 27c Switching valve, 50 Partitioning plate, 51a First sensor, 51b Second sensor, 51c Third sensor, 52a First valve, 52b Second valve, 52c Third valve, 53 Control unit, 54 Control cable

The invention claimed is:

1. A water treatment device, comprising:
a plurality of electrodes which includes a pair of electrodes disposed distanced from each other and opposing;
an electrically insulating, water permeable separator provided between the pair of electrodes;
an electrically insulating receptacle that houses the plurality of electrodes and the separator; and
a conductive porous substance disposed in multiple spaces in the receptacle compartmentalized by the separator, wherein
the receptacle includes:
a treatment target water introduction portion through which treatment target water is introduced into the receptacle,
a backwashing fluid introduction portion through which a backwashing fluid is introduced into the receptacle from a direction differing from that of the treatment target water, and
a region in which the conductive porous substance is not disposed while the conductive porous substance is disposed in the spaces during adsorption during which treatment target water is introduced into the receptacle when voltage is applied between the pair of electrodes which causes adsorbing of ions included in the treatment target water, and
the region in which the conductive porous substance is not disposed during the adsorption is a region into which the conductive porous substance flows during desorption which introduces the backwashing fluid and releases a charge accumulated between the pair of electrodes and desorbing ions adsorbed to the conductive porous substance.

2. The water treatment device according to claim 1, wherein the receptacle has the region in which the conductive porous substance is not disposed during the adsorption between the conductive porous substance and the treatment target water introduction portion.

3. The water treatment device according to claim 1, comprising:
a treatment target water introduction pipe connected to the treatment target water introduction portion;
a desalinated water discharge pipe through which treated water after the treatment target water is treated is discharged from the receptacle;
a backwashing fluid introduction pipe connected to the backwashing fluid introduction portion;
a backwashing fluid discharge pipe through which backwashing fluid is discharged from the receptacle;
valves provided in each of the treatment target water introduction pipe, the desalinated water discharge pipe, the backwashing fluid introduction pipe, and the backwashing fluid discharge pipe;
a multiple of sensors that detect ion concentrations of at least the treatment target water, the treated water, and the backwashing fluid after backwashing; and
a control unit that calculates a rate of ion removal from the treatment target water by the conductive porous substance and a rate of ion desorption from the conductive porous substance using the ion concentrations detected by the sensors, and controls switching of the valves and an application of voltage between the pair of electrodes based on the calculated ion removal rate and the calculated ion desorption rate.

4. The water treatment device according to claim 1, wherein a water permeable holding body that holds the conductive porous substance is provided in an interior of the receptacle, and the water treatment device has a space for stocking the backwashing fluid between the holding body and a bottom portion of the receptacle.

5. The water treatment device according to claim 1, wherein the conductive porous substance is granular activated carbon.

6. The water treatment device according to claim 1, wherein the pair of electrodes and the separator are all disposed in a vertical direction, and the conductive porous substance is disposed so that uppermost portions thereof are higher than the pair of electrodes and lower than the separator.

7. The water treatment device according to claim 1, wherein each electrode of the pair of electrodes has a semi-circular sectional form, and the pair of electrodes are disposed so that depressed portions thereof oppose each other, and are formed integrally across the separator of a plate-form.

8. The water treatment device according to claim 1, comprising as the one pair of electrodes a cylindrical electrode and a central electrode provided on an inner side of the cylindrical electrode and coaxial with the cylindrical electrode, wherein the separator of a cylindrical form coaxial with the cylindrical electrode is provided between the cylindrical electrode and the central electrode.

9. The water treatment device according to claim 8, wherein the receptacle is of a cylindrical form coaxial with the cylindrical electrode, and the conductive porous substance is disposed between the receptacle and the cylindrical electrode.

10. The water treatment device according to claim 1, wherein:
said pair of electrodes is a first pair of rod-form electrodes the water treatment device further comprising a second pair of rod-form electrodes,
wherein the receptacle is compartmentalized into four spaces by the separator, and the rod-form electrodes are provided one in each of the four spaces at equal intervals from each other.

11. The water treatment device according to claim 1, further comprising a third electrode,
wherein a center one of the electrodes is a common electrode, and is of a polarity differing from that of the other two electrodes.

12. The water treatment device according to claim 1, wherein each of the pair of electrodes is of a sectional form having a depressed portion, and one portion of a first electrode of the pair of electrodes is disposed in the depressed portion of a second electrode of the pair of electrodes.

13. The water treatment device according to claim 1, comprising a multiple of water treatment units including the pair of electrodes, the separator, the conductive porous substance, and the receptacle, wherein the pair of electrodes of each water treatment unit are connected to each other via a switching circuit, and a charge accumulated in any one of the water treatment units is supplied to another of the water treatment units via the switching circuit.

14. The water treatment device according to claim 1, wherein a multiple of water treatment units including the one pair of electrodes, the separator, the conductive porous substance, and the receptacle are connected in series, and the treated water treated by the conductive porous member on a positive electrode side and the treated water treated by the conductive porous member on a negative electrode side of the water treatment unit in a first stage are recovered separately, and introduced so as to be treated in the water treatment unit in a second stage by the conductive porous substance that are of polarities the reverse of those in the first stage water treatment unit.

15. A water treatment method performed by a water treatment device that includes an electrically insulating, a water permeable separator between a plurality of electrodes which includes a pair of electrodes housed in an electrically insulating receptacle, a conductive porous substance in a multiple of spaces in the receptacle compartmentalized by the separator, and a region in which the conductive porous substance is not disposed in an adsorption step the method comprising:
alternately carrying out the adsorption step of introducing treatment target water into the receptacle in a state wherein voltage is applied between the pair of electrodes, thereby causing ions included in the treatment target water to be adsorbed to the conductive porous substance, and
a desorption step of releasing a charge accumulated between the pair of electrodes, thereby causing ions adsorbed to the conductive porous substance to be desorbed, wherein a backwashing fluid is introduced into the receptacle from a direction differing from that of the treatment target water in the desorption step, thereby causing the conductive porous substance to flow, wherein
the region in which the conductive porous substance is not disposed in the adsorption step is a region into which the conductive porous substance flows in the desorption step.

16. The water treatment method according to claim 15, wherein ion concentrations of each of the treatment target water and treated water that is the treatment target water after being treated are detected in the adsorption step, a rate of ion removal from the treatment target water by the conductive porous substance is obtained based on the ion concentrations, the adsorption step is continued when the ion removal rate is equal to or greater than a predetermined value, and a switch is made to the desorption step when the ion removal rate is smaller than the predetermined value.

17. The water treatment method according to claim 15, wherein an ion concentration of the backwashing fluid after backwashing is detected in the desorption step, a rate of ion desorption from the conductive porous substance is obtained based on the ion concentration, the desorption step is continued when the ion desorption rate is smaller than a predetermined value, and a switch is made to the adsorption step when the ion desorption rate is equal to or greater than the predetermined value.

18. A water treatment device, comprising:
a plurality of electrodes which includes a pair of electrodes disposed distanced from each other and opposing;
an electrically insulating, water permeable separator provided between the pair of electrodes;
an electrically insulating receptacle that houses the plurality of electrodes and the separator; and
a conductive porous substance disposed in multiple spaces in the receptacle compartmentalized by the separator, wherein
the receptacle includes:
a treatment target water introduction portion through which treatment target water is introduced into the receptacle,
a backwashing fluid introduction portion through which a backwashing fluid is introduced into the receptacle from a direction differing from that of the treatment target water, and
a region in which the conductive porous substance is not disposed while the conductive porous substance is disposed in the spaces wherein
the pair of electrodes and the separator are all disposed in a vertical direction, and the conductive porous substance is disposed so that uppermost portions thereof are higher than the pair of electrodes and lower than the separator.

* * * * *